United States Patent [19]
Fujitani et al.

[11] Patent Number: 5,139,855
[45] Date of Patent: Aug. 18, 1992

[54] STRETCH WRAP FILM

[75] Inventors: Shigeo Fujitani; Hisashi Nakagawa, both of Yokohama; Masatoshi Oki, Ebina, all of Japan

[73] Assignee: Nippon Unicar Company Limited, Danbury, Conn.

[21] Appl. No.: 713,849

[22] Filed: Jun. 12, 1991

[51] Int. Cl.$^5$ .............................................. B32B 7/02
[52] U.S. Cl. .................................... 428/215; 428/349; 428/516; 428/520
[58] Field of Search ............... 428/349, 516, 216, 215, 428/520

[56] References Cited

U.S. PATENT DOCUMENTS

| | | | |
|---|---|---|---|
| 4,436,788 | 3/1984 | Cooper | 428/349 |
| 4,671,987 | 6/1987 | Knott, II et al. | 428/216 |
| 4,863,770 | 9/1989 | Knox, III et al. | 428/349 |

FOREIGN PATENT DOCUMENTS 91930 7/1983 Australia .
317166 5/1989 European Pat. Off. .

OTHER PUBLICATIONS

Ealer et al., Evaluating Rotary Stretch-Wrap Films, Modern Plastics, Aug. 1978, pp. 52 to 54 and 57.
Martino, Stretch Wrap Rules, etc., Modern Plastics, International, Nov. 1980, pp. 26 to 29.

Primary Examiner—Edith L. Buffalow
Attorney, Agent, or Firm—Saul R. Bresch

[57] ABSTRACT

A laminated stretch wrap film comprising an intermediate layer and two outer layers wherein (i) the intermediate layer is comprised of polyethylene having a density equal to or less than 0.910 gram per cubic centimeter blended with about 5 to about 30 percent by weight polypropylene, the percent by weight being based on the combined weight of the polyethylene and polypropylene; and (ii) the outer layers are comprised of ethylene-vinyl acetate copolymer.

9 Claims, No Drawings

STRETCH WRAP FILM

TECHNICAL FIELD

This invention relates to stretch wrap film useful in packaging foodstuffs.

BACKGROUND INFORMATION

It has been proposed that stretch wrap film be manufactured from polyvinylidene chloride, polyvinyl chloride, high pressure polyethylene, ethylene-vinyl acetate copolymer, polypropylene, linear low density polyethylene, polybutadiene, and other similar polymers. Those commonly used in the preparation of stretch wrap film are polyvinylidene chloride, polyvinyl chloride, high pressure polyethylene, and polybutadiene.

Since stretch wrap film is used in wrapping, protecting, storing, transporting, and displaying perishable foods, the following properties are desirable: it should be able to adhere to itself and yet be easily peeled off of the food: the stretch wrap film should have good heat sealing properties; it should be easily cut transversely with the sawtooth cutters used in packaging, and should not split longitudinally; the film should not contain impurities harmful to health; it needs good heat resistance and should be moisture proof, impervious to air, acid resistant, oil resistant, strong, extensible, and shrinkable; the stretch wrap film should also be transparent, drop resistant, and haze resistant; and it should not exhibit brittleness at low temperatures.

Polyvinylidene chloride stretch wrap film tends to wear in an unintended direction when cut with a sawtooth cutter; it shrinks to the breaking point when heated; and is brittle at low temperatures. Polyvinyl chloride film is similar to polyvinylidene chloride. In addition, the film tends to whiten in boiling water and contains a large amount of plasticizer, which can be considered an objectionable impurity. Further, the halogen present in both is also considered to be objectionable.

To overcome the deficiencies of polyvinylidene chloride and polyvinyl chloride films, high pressure polyethylene film was suggested as it does not contain halogen, but the film lacks the ability to adhere to itself and does not stretch. Ethylene-vinyl acetate copolymer film has good self-adherence, but poor mechanical strength and modulus. Polypropylene has good heat resistance, but is brittle at low temperatures; does not adhere to itself to any extent; and does not cut well with the sawtooth cutter. Linear low density polyethylene has the same cutting deficiency, and it is difficult to peel from itself, i.e., when provided as a rolled film. It does have good mechanical strength, however, when compared with high pressure polyethylene. Polybutadiene film has many desirable advantages, but its mechanical strength, e.g. tear strength, is poor, and it is expensive.

DISCLOSURE OF THE INVENTION

An object of this invention, therefore, is to provide a stretch wrap film which does not have the deficiencies noted above, i.e., one having the enumerated qualities, which are so important to film with which food will be wrapped.

Other objects and advantages will become apparent hereinafter.

According to the present invention, the above object is met by a laminated shrink wrap film comprising an intermediate layer and two outer layers wherein (i) the intermediate layer is comprised of polyethylene having a density equal to or less than 0.910 gram per cubic centimeter blended with about 5 to about 30 percent by weight polypropylene based on the combined weight of the polyethylene and polypropylene; and (ii) the outer layers are comprised of ethylene-vinyl acetate copolymer.

DESCRIPTION OF THE PREFERRED EMBODIMENT(S)

The intermediate layer is disposed between two outer layers comprised of ethylene-vinyl acetate copolymer. The vinyl acetate content of the copolymer is in the range of about 5 to about 25 percent by weight based on the weight of the copolymer, and is preferably present in the range of about 10 to about 20 percent by weight.

The intermediate layer is comprised of a very low density polyethylene (VLDPE) having a density equal to or less than about 0.910 gram per cubic centimeter. The density is preferably in the range of about 0.880 to about 0.910 gram per cubic centimeter.

The polyethylene is a copolymer of ethylene and one or more alpha-olefins having 3 to 12 carbon atoms. Examples of preferred alpha-olefin comonomers are propylene, 1-butene, 1-hexene, 4-methyl-1pentene, and 1-octene. The most preferred comonomer is 1-butene.

The VLDPE can be, and is preferably, prepared using one of the following processes:

(i) A process comprising contacting a mixture comprising ethylene and one or more alpha-olefins in the gas phase, in a fluidized bed reactor, under polymerization conditions, with a catalyst system comprising:

(a) a titanium based catalyst precursor having the formula $Mg_aTi(OR)_bX_c(ED)_d$ wherein R is an aliphatic or aromatic hydrocarbon radical having 1 to 14 carbon atoms or COR' wherein R' is an aliphatic or aromatic hydrocarbon radical having 1 to 14 carbon atoms;

each OR group is the same or difference;

each X is independently chlorine, bromine, or iodine;

ED is an electron donor;

a is 0.5 to 56;

b is 0, 1 or 2;

c is 2 to 116; and d is greater than 1.5 a+2;

(b) at least one modifier having the formula $BX_3$ or $AlR_{(3-b)}X_b$ wherein each R is alkyl or aryl and is the same or different, and X and b are as defined above for component (a), wherein components (a) and (b) are impregnated into an inorganic support; and (c) a hydrocarbyl aluminum cocatalyst.

The above titanium based catalyst and the method for its preparation are disclosed in U.S. Pat. No. 4,303,771, as well as the utilization of the catalyst in the polymerization process.

(ii) A process comprising contacting a mixture comprising ethylene and one or more alpha-olefins in the gas phase, in a fluidized bed reactor, under polymerization conditions, with a catalyst system comprising:

(a) the reaction product of a vanadium compound and an electron donor impregnated into an inorganic support;

(b) a halocarbon promoter; and (c) a hydrocarbyl aluminum cocatalyst.

The above vanadium based catalyst and the method for its preparation are disclosed in U.S. Pat. No.

4,508,842, as well as the utilization of the catalyst in the polymerization process. A typical fluidized bed reactor is described in U.S. Pat. No. 4,482,687.

Both of the above processes are conducted under low pressure in the range of about 10 psig to about 1000 psig, and are preferably carried out on a continuous basis. The polymerization temperature for the titanium based catalyst system is in the range of about 10° C. to about 80° C. and for the vanadium based catalyst system in the range of about 10° C. to about 85° C. An inert gas such as nitrogen in an amount of at least 25 mol percent based on the total number of mols of gases introduced into the reactor is preferably used as well as an alpha-olefin to ethylene mol ratio in the range of about 0.35:1 to about 8:1 to obtain the required density of equal to or less than 0.910 gram per cubic centimeter. The crystallinity of the polyethylene can be as low as about 18 percent by weight. The polyethylene has a low Young's modulus of elasticity and a melting point as low as about 118° C.

The VLDPE is blended with polypropylene, which can be prepared as described in U.S. Pat. No. 4,414,132 and U.S. Pat. application Ser. No. 51,853 filed on May 18, 1987.

The amount of VLDPE in the blend is in the range of about 70 to about 95 parts by weight, and is preferably in the range of about 70 to about 90 parts by weight. The amount of polypropylene, which can be blended with the polyethylene, is in the range of about 5 to about 30 parts by weight, and is preferably in the range of about 10 to about 25 parts by weight.

The polypropylene can be a homopolymer of propylene or a copolymer of propylene and one or more alpha-olefins have 2 or 4 to 12 carbon atoms, the comonomers being present in an amount of about 1 to about 20 percent by weight based on the weight of the copolymer, and preferably in an amount of about 5 to about 15 percent by weight. The density of the polypropylene can be in the range of about 0.895 to about 0.915 gram per cubic centimeter and the melt index can be about 0.5 to about 30 grams per 10 minutes.

A preferred blend of polyethylene and polypropylene additionally includes a copolymer of ethylene and vinyl acetate (EVA copolymer), which is substituted for about 1 to about 15 percent by weight of the polyethylene. This EVA copolymer can be, and is preferably, the same as the EVA copolymer used in the outer layers of the laminate.

As noted, subject laminate has three basic layers. While additional layers can be interposed into the laminate, the three layer structure is preferred, i.e., the polyethylene blend sandwiched between layers of EVA copolymer.

The EVA copolymer can have a vinyl acetate (VA) content in the range of about 5 to about 25 percent by weight based on the weight of the copolymer, and preferably has a vinyl acetate content in the range of about 10 to about 20 percent by weight. Further, it can have a melt index in the range of about 0.3 to about 3 grams per 10 minutes. The melt index is preferably in the range of about 0.7 to about 2.5 grams per ten minutes. Melt index is determined under ASTM D-1238, Condition E.

The relationship between the melting point (MP) of the EVA copolymer and the vinyl acetate content of the EVA copolymer is expressed by the following equation:

$$MP = 114 - 1.44 \times VA\ content$$

wherein MP is given in degrees Centigrade and VA content is in weight percent based on the weight of the EVA copolymer.

The molecular weight distribution of the EVA copolymer or Mw/Mn ratio is preferably less than about 4. Mw represents weight average molecular weight and Mn represents number average molecular weight. The elements of the molecular weight distribution are measured by gel permeation chromatography (GPC).

It is noted that the EVA copolymer preferably used in the outer layers of the laminate has a melting point two to five degrees Centigrade higher than EVA copolymers with an equal VA content in general use.

It is preferable that the outer layers of the laminate contain an anti-haze agent such as a glycerol fatty acid ester, a sorbitan fatty acid ester, a propylene glycol fatty acid ester, or addition products of ethylene oxide such as polyethylene glycol stearate, or mixtures of the foregoing compounds.

The laminate is formed using a co-extruder. Conventional techniques such as the inflation method using a circular die and the T-die method using a flat die are utilized to accomplish the co-extrusion.

The thickness of the three tiered laminate can be in the range of about 10 to about 50 microns or greater and is preferably about 12 to about 20 microns.

The intermediate layer is about 3 to about 30 microns thick, and is preferably about 5 to 15 microns in thickness. Each outer layer is about 2 to about 20 microns in thickness and is preferably about 5 to about 15 microns thick just as the intermediate layer.

The patents mentioned in the specification are incorporated by reference herein.

The invention is illustrated by the following examples.

EXAMPLES 1 to 15

A stretch wrap film is formed on a co-extruder using the inflation method and a circular die.

The intermediate layer is a blend of (i) a copolymer of ethylene and 1-butene having a density of 0.906 gram per cubic centimeter and a melt index of 0.8 gram per 10 minutes prepared by the gas-phase, low pressure process described above for the titanium based catalyst system and (ii) polypropylene having a density of 0.915 gram per cubic centimeter and a melt index of 9 grams per 10 minutes.

In examples 5, 6 and 12, an EVA copolymer (EVA copolymer I) having a density of 0.940 gram per cubic centimeter, a melt index of 1.5 grams per 10 minutes, and a vinyl acetate content of 15 percent by weight based on the weight of the EVA copolymer is introduced into the polyethylene/polypropylene blend.

Each outer layer is an EVA copolymer. In examples 2, 4, 6 and 8, the EVA copolymer (EVA copolymer I) is the same as that described above. In the remaining examples, the EVA copolymer (EVA copolymer II) has a density of 0.931 gram per cubic centimeter; a melt index of 2.3 grams per 10 minutes; a vinyl acetate content of 7.5 percent by weight; a melting point of 96° C.; and an Mw/Mn ratio of 3.5.

Sorbitan monooleate, an anti-haze agent, is added to each of the outer layers in an amount of 2 percent by weight based on the weight of the layer to which it is added.

A blown laminated film is formed by air cooling using, as a co-extruder, an inflation film forming machine. The diameter of the blown film is 120 millimeters and the length to diameter ratio is 28. The die is a ring three-layer die having a diameter of 150 millimeters. The discharge amount is 45 kilograms per hour; the die temperature is 180° C.; and the blow ratio of 4.5.

The film of each example is measured to determine whether it has the following satisfactory properties:

(i) a longitudinal tear strength of at least 30 kilograms per centimeter; a transverse tear strength of no greater than 120 kilograms per centimeter (ASTM D-1922);

(ii) a haze value of 5 or less (ASTM D-1003);

(iii) cuts cleanly in a transverse direction with a sawtooth cutter;

(iv) a polypropylene tray containing rice is wrapped with the film and heated to 120° C. The film does not break;

(v) each film is pressed against itself and left in that state. There is no peeling;

(vi) a polypropylene tray containing crab legs is tightly wrapped with the film. The film is not broken by the hard shell of the crab legs;

(vii) a polypropylene tray containing parsley is wrapped with film. The wrapped tray is put in a freezer at minus 50° C., and taken out after 30 minutes. The film does not break;

(viii) a polypropylene tray containing six apples, each about ten centimeters in diameter, is wrapped so that the film is extended about 20 percent beyond its original size. No shrinkage takes place;

(ix) at 1% modulus, the value is at least 850 kilograms per square centimeter (ASTM D-882);

(x) a semicircular metal rod is formed with a 0.5 centimeter radius. The rod is pressed against the stretch wrapped film to a depth of 1.5 centimeters. After 10 minutes, the recovery is measured. The film is restored to its original state.

1 = The results of an above test are better than satisfactory for food packaging.

2 = The results of an above test are satisfactory for food packaging.

3 = The results of an above test are less than satisfactory, but acceptable, for food packaging.

4 = The results of an above test are neither satisfactory nor acceptable for food packaging.

Composition, thickness, and evaluation are set forth in the following Table.

TABLE

| Example | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Intermediate layer (parts by weight) | | | | | | | | | | | | | | | |
| Polyethylene | 95 | 90 | 80 | 70 | 85 | 70 | 90 | 90 | 90 | 98 | 65 | 60 | 90 | 90 | 90 |
| Polypropylene | 5 | 10 | 20 | 30 | 10 | 20 | 10 | 10 | 10 | 2 | 35 | 35 | 10 | 10 | 10 |
| EVA copolymer II | 0 | 0 | 0 | 0 | 5 | 10 | 0 | 0 | 0 | 0 | 0 | 5 | 0 | 0 | 0 |
| Outer layers (parts by weight) | | | | | | | | | | | | | | | |
| EVA copolymer I | 100 | 0 | 100 | 0 | 100 | 0 | 100 | 0 | 100 | 100 | 100 | 100 | 100 | 100 | 100 |
| EVA copolymer II | 0 | 100 | 0 | 100 | 0 | 100 | 0 | 100 | 0 | 0 | 0 | 0 | 0 | 0 | 0 |
| Film thickness (microns) | | | | | | | | | | | | | | | |
| Intermediate layer | 5 | 5 | 5 | 5 | 5 | 5 | 10 | 20 | 20 | 5 | 5 | 5 | 2 | 2 | 40 |
| Outer layer | 5 | 5 | 5 | 5 | 5 | 5 | 10 | 10 | 15 | 5 | 5 | 5 | 3 | 15 | 5 |
| Outer layer | 5 | 5 | 5 | 5 | 5 | 5 | 10 | 10 | 15 | 5 | 5 | 5 | 3 | 15 | 5 |
| Total Thickness | 15 | 15 | 15 | 15 | 15 | 15 | 30 | 40 | 50 | 15 | 15 | 15 | 8 | 32 | 50 |
| Evaluation: | | | | | | | | | | | | | | | |
| (i) | 2 | 2 | 1 | 1 | 2 | 1 | 1 | 2 | 1 | 4 | 1 | 1 | 4 | 4 | 1 |
| (ii) | 1 | 1 | 3 | 2 | 3 | 2 | 3 | 2 | 3 | 2 | 4 | 4 | 1 | 2 | 2 |
| (iii) | 3 | 2 | 1 | 1 | 2 | 1 | 1 | 2 | 1 | 4 | 1 | 1 | 4 | 4 | 4 |
| (iv) | 2 | 3 | 1 | 1 | 1 | 1 | 2 | 2 | 2 | 4 | 1 | 1 | 4 | 4 | 2 |
| (v) | 3 | 2 | 3 | 2 | 3 | 2 | 3 | 2 | 3 | 2 | 2 | 2 | 2 | 2 | 2 |
| (vi) | 2 | 3 | 1 | 1 | 2 | 1 | 2 | 2 | 1 | 4 | 1 | 1 | 4 | 4 | 1 |
| (vii) | 3 | 2 | 3 | 3 | 3 | 3 | 3 | 2 | 3 | 2 | 4 | 4 | 2 | 2 | 4 |
| (viii) | 2 | 2 | 3 | 3 | 3 | 3 | 3 | 2 | 3 | 1 | 4 | 4 | 3 | 1 | 4 |
| (ix) | 2 | 3 | 1 | 1 | 1 | 1 | 1 | 2 | 1 | 4 | 1 | 1 | 4 | 4 | 1 |
| (x) | 2 | 3 | 1 | 1 | 1 | 1 | 1 | 2 | 1 | 4 | 1 | 1 | 4 | 4 | 1 |
| Composite evaluation: | | | | | | | | | | | | | | | |
| Number of 1's | 1 | 1 | 6 | 6 | 3 | 6 | 4 | 0 | 5 | 1 | 6 | 6 | 1 | 1 | 4 |
| Number of 2's | 6 | 5 | 0 | 2 | 3 | 2 | 2 | 10 | 1 | 3 | 1 | 1 | 2 | 3 | 3 |
| Number of 3's | 3 | 4 | 4 | 2 | 4 | 2 | 4 | 0 | 4 | 0 | 0 | 0 | 1 | 0 | 0 |
| Number of 4's | 0 | 0 | 0 | 0 | 0 | 0 | 0 | 0 | 0 | 6 | 3 | 3 | 6 | 6 | 3 |

We claim:

1. A laminated stretch wrap film comprising an intermediate layer disposed between two outer layers wherein (i) said intermediate layer is comprised of a blend of about 70 to about 95 parts by weight of a copolymer of ethylene and one or more alpha-olefins having 3 to 12 carbon atoms, such copolymer having a density in the range of about 0.880 to about 0.910 gram per centimeter and about 5 to about 30 parts by weight of a homopolymer or copolymer of propylene and one or more alpha-olefins having 2 or 4 to 12 carbon atoms having a density in the range of about 0.895 to about 0.915 gram per cubic centimeter; and (ii) said outer layers are comprised of a copolymer of ethylene and vinyl acetate having a vinyl acetate content in the range of about 5 to about 25 percent by weight based on the weight of the copolymer.

2. The film defined in claim 1 wherein the outer layers contain an anti-haze additive.

3. The film defined in claim 2 wherein the anti-haze additive is a glycerol fatty acid ester, a sorbitan fatty acid ester, a propylene glycerol fatty acid ester, or polyethylene stearate, or mixtures thereof.

4. The film defined in claim 1 wherein the vinyl acetate content is about 10 to about 20 percent by weight.

5. The film defined in claim 1 wherein the blend of polyethylene and polypropylene additionally includes a copolymer of ethylene and vinyl acetate in an amount of about 1 to about 15 percent by weight based on the weight of the polyethylene.

6. The film defined in claim 5 wherein the vinyl acetate content is in the range of about 5 to about 25 percent by weight based on the weight of each ethylene-vinyl acetate copolymer.

7. The film defined in claim 5 wherein the Mw/Mn ratio of each ethylene-vinyl acetate copolymer is less than about 4.

8. The film defined in claim 1 wherein the intermediate layer is about 3 to about 30 microns thick; each outer layer is about 2 to about 20 microns thick; and the laminate is at least about 10 microns thick.

9. The film defined in claim 1 wherein the copolymer of ethylene and alpha-olefin is prepared by a low pressure, gas phase, fluidized bed process using a titanium or vanadium based supported catalyst system including aluminum-containing compounds.

* * * * *